455-619 AU 233 EX

FIP8106 XR 3,652,353

[redacted]

T3704

X5012C

United State: ~~F3000E~~

[15] 3,652,858

Kinsel

[45] Mar. 28, 1972

[54] OPTICAL HETERODYNE TIME-DIVISION DEMULTIPLEXER EMPLOYING STROBED ASSIGNMENT OF CHANNELS AMONG A TANDEM SEQUENCE OF HETERODYNING ELEMENTS

[72] Inventor: Tracy Stewart Kinsel, Bridgewater Township, Somerset County, N.J.

[73] Assignee: Bell Telephone Laboratories, Incorporated, Murray Hill, N.J.

[22] Filed: Sept. 25, 1970

[21] Appl. No.: 75,543

[52] U.S. Cl. ....................250/199

[51] Int. Cl. ....................H04b 9/00

[58] Field of Search ....................235/181; 250/199, 208; 307/88.3, 311, 312; 329/144; 324/77 I; 340/146.3 Q; 356/110; 343/100 CL; 356/23

[56] References Cited

OTHER PUBLICATIONS

R. Broom et al., Demultiplexing of Fast Optical PCM, Archive der Elektrischen Übertragung, V. 23, pp 375–377, July 1969.

*Primary Examiner*—Robert L. Griffin
*Assistant Examiner*—Albert J. Mayer
*Attorney*—R. J. Guenther and Arthur J. Torsiglieri

[57] ABSTRACT

There is disclosed a receiver for a time-division-multiplex optical PCM communication system in which demultiplexing is achieved without power-division losses by directing the received pulse trains recurring at a multiple of the channel bit rate and the local oscillator or strobe pulses at the channel bit rate in opposite directions and sequences through aligned heterodyning elements, such as semitransparent photocathodes of photomultiplier detectors for the individual channels. The received pulses and local oscillator pulses have differing optical frequencies; and the coincidences of these pulses are sensed at the channel detectors to separate the channels. Illustratively, the coincidences at the photomultipliers are sensed by electrical filters having a passband including an upper cutoff frequency lower than the channel bit rate and means for disabling the output of the filter in time for reception of a signal in the next time slot for that channel.

5 Claims, 3 Drawing Figures

INVENTOR
T. S. KINSEL
BY Wilford L. Wisner
ATTORNEY

OPTICAL HETERODYNE TIME-DIVISION DEMULTIPLEXER EMPLOYING STROBED ASSIGNMENT OF CHANNELS AMONG A TANDEM SEQUENCE OF HETERODYNING ELEMENTS

BACKGROUND OF THE INVENTION

This invention relates to receivers for optical communication systems in which a number of independent information channels are time-division-multiplexed and in which, typically, the information is represented by on-off pulse code modulation. Suitable modulations may be made for other modulation formats. The information channels are said to be time-division-multiplexed when bits of information from each channel are interleaved in time in one-to-one correspondence with bits from all the other channels in a repetitive manner to yield pulse trains in which all channels are represented.

It has been shown that the information rate of a digital optical communication system may be increased by the use of optical time-division-multiplexing. For example, see my article with R. T. Denton, "Terminals for a High Speed Optical Pulse Code Modulation Communication System: II. Optical Multiplexing and Demultiplexing," *Proceedings of the IEEE*, Vol. 56, page 146 (FEB. 1968).

This technique is most effective when a mode-locked laser is used to provide pulses which are manipulated with an appropriate digital format, as described in a companion article with R. T. Denton in the same journal as above cited, at page 140. The pulses representing each channel are modulated to represent the information to be transmitted in that channel and then interleaved with the modulated pulses from the other channels to form a very high density pulse stream.

Some technique for demultiplexing is used at the receiver of such a system to separate the individual channels, so that the pulses representing information in each channel may be detected with meaningful continuity. A basic technique for demultiplexing is based on recognizing that, at one instant of time, the different channels will be assigned to different positions in space. If we were to strobe the multiplexed stream at the frequency of the single channel, then the same channels would be assigned to the same positions in space at the time of every strobe occurrence. An array of strobed photosensitive detectors can readily be arranged at these positions.

Several specific ways for implementing such strobed demodulators have been suggested. Three of these ways have been described by R. F. Broom et al. "Demultiplexing of Fast Optical Pulse Code Modulation," *Archiv. Elektr. Übertragung*, Vol. 23, p. 375, (July 1969). These techniques generally involve the interaction of the received signal pulses and local oscillator pulses from a mode-locked laser at the receiver operating at the repetition rate of a single channel in some optically nonlinear medium. Except for a technique employing a two-photon fluorescent medium, these techniques have generally required lossy elements between the channel detectors and frequently also have involved loss of modulated signal pulse energy in similar lossy elements between the detecting elements for the different channels.

Moreover, because of the low conversion efficiencies of presently available nonlinear materials, these devices are quite inefficient.

It is therefore clearly desirable to implement a demultiplexing technique of the foregoing type without power division losses and with more efficient elements for the individual channels.

SUMMARY OF THE INVENTION

Accordingly, I have invented a receiver for a time-division-multiplexed optical PCM communication system, in which demultiplexing is achieved without power division losses by directing the received multiplexed pulse train and local oscillator or strobe pulses at the channel bit rate in opposite directions through aligned heterodyning detectors, each detector assigned to a separate channel. The received pulses and local oscillator pulses have differing optical frequencies; and the channel detectors include means for detecting coincidences of the modulated pulses and local oscillator pulses at the heterodyning elements.

In a preferred embodiment of my invention, the heterodyning elements are semi-transparent photocathodes of photomultipliers; and the channel detectors further include bandpass filters for passing intermodulation products having frequencies between zero frequency and the channel bit rate and blocking frequencies equal to or greater than the channel bit rate and blocking zero frequency. This arrangement removes the background signal that would otherwise be present in the output because of the response of the photomultipliers to individual signal or strobe pulses under conditions of no heterodyning coincidence.

As a further feature of the foregoing specific embodiment of my invention, the outputs of the bandpass filters are disabled after a time period comparable to the single channel bit time slot, so that the photomultiplier is ready to detect the next pulse for that channel.

BRIEF DESCRIPTION OF THE DRAWING

Further features and advantages of my invention will become apparent from the following detailed description, taken together with the drawing, in which.

DESCRIPTION OF ILLUSTRATIVE EMBODIMENT

Figure 1:
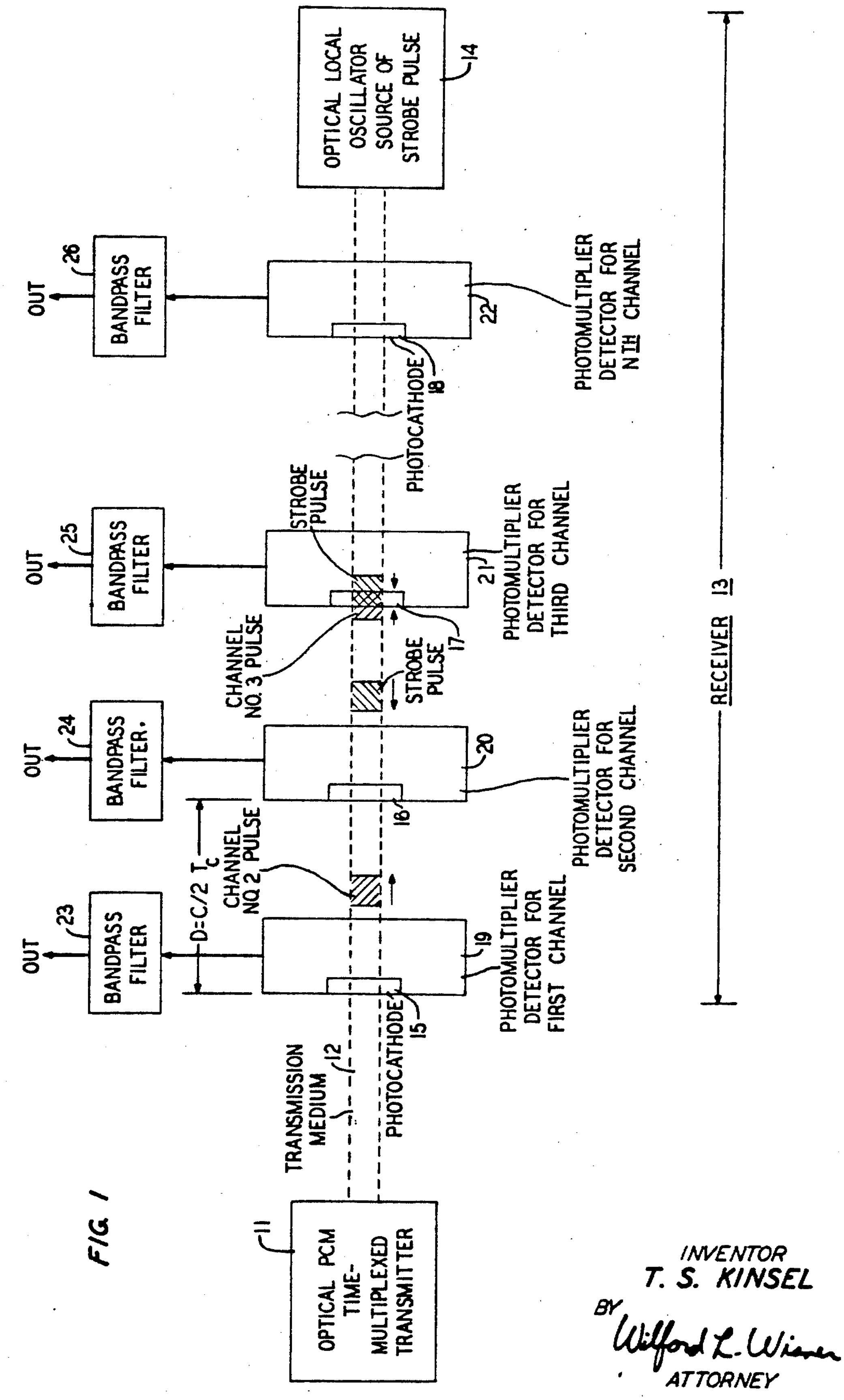
FIG. 1 is a partially pictorial and partially block diagrammatic illustration of a preferred embodiment of my invention.

A heterodyne demultiplexing and detection arrangement implementing my invention is shown in FIG. 1. This arrangement has the object of providing more efficient demultiplexing than heretofore available and also provides a desirable simplicity in that the modulated pulse trains and the local oscillator or strobe pulses propagate in opposite directions through all of the heterodyning elements without the aid of any beam splitters or loss-producing elements other than those directly producing the heterodyning action.

The modulated pulse trains are provided in a continuous stream of short optical pulses from an optical PCM time-division-multiplexed transmitter 11 and are received after propagation through a transmission medium 12 at the PCM receiver 13. The PCM receiver 13 includes the optical local oscillator source 14, such as a mode-locked laser, which provides short optical pulses recurring at the channel bit rate in order to produce the strobing action of the type described above.

It will be seen that the source 14 is disposed so that its pulses propagate in a direction opposite that of the received pulses, but along a common path traversed by those modulated optical pulses.

Aligned along the common path are the photocathodes 15, 16, 17 and 18 of the photomultipliers 19, 20, 21, and 22, which respectively serve the first, second, third and nth output information channels of the receiver 13. The photomultipliers 19 through 22 are drawn diagrammatically as encompassing their associated photocathodes, but it should be understood that they need impose no loss in the optical common path other than that provided by the associated photocathode. A typical arrangement for the electronics of the photomultipliers would differ from a conventional photomultiplier in that the accelerating electrodes and associated components would be turned laterally to the light beam and offset from its path so as not to block it. The photo-emitted electrons would be collected out of the path of the light beam. An advantage of this arrangement is that the overall photomultiplier length along the light beam path can be made very small.

Alternatively, a conventional photomultiplier tube can be used at an oblique incidence of the light beam upon the photocathode, thereby allowing the light beam to pass out through a transparent side wall of the tube.

The photocathodes of the respective photomultipliers are separated by half of the spatial separation of the information-modulated pulses of the corresponding channels within each PCM pulse train.

The outputs of photomultipliers 19 through 22 are coupled to the inputs of bandpass filters 23 through 26, respectively. The desired channel output signals are obtained in baseband pulse-code-modulated form at the outputs of filters 23 through 26. The decoding of these output pulse signals is well known in the PCM art and is not detailed here, as it is not a part of the present invention.

For assistance in understanding how the strobing provided by source 14 "freezes" each successive multiplexed pulse train with its respective channel bits in the same positions as for the previous pulse trains, representative pulses are shown shaded in FIG. 1. For example, a pulse representative of information in channel No. 3 is shown with its leading edge just passed through photocathode 17. At the same time, a strobe pulse has penetrated photocathode 17 to the same degree from the opposite side. Thus, there will be coincidence of these two pulses in photocathode 17 throughout the duration of both pulses, even though they are propagating in opposite directions.

At this instant of time, a PCM pulse representative of information in channel No. 2 is propagating toward photocathode 16 from the left. It will coincide therein with the same strobe pulse which has previously penetrated the photocathode of photomultiplier 21 and is travelling toward the photocathode of photomultiplier 20. The modulated pulse of channel 2 and the strobe pulse are equidistant from the respective nearest surfaces of photocathode 16. Thus, it is seen that they will also experience coincidence in photocathode 16.

Since each strobe pulse will produce heterodyning action with all the pulses representing information in all of the channels, it should be apparent that the photocathodes 15 through 18 must be relatively transmissive in order to avoid unnecessary attenuation of the strobe pulse. Likewise, the modulated pulses, which have experienced attenuation during transmission through as many as n–1 photocathodes should also be subjected to a minimum of unnecessary attenuation. Therefore, I suggest the use of semi-transparent photocathodes which can transmit up to 90 percent of the radiation incident upon them. The preceding basic description should also make clear that this spacing of the photocathodes 15 through 18 is approximately equal to one-half the spatial separation of the corresponding local oscillator pulses. This spacing may be slightly modified with respect thereto to account for the required propagation time of the strobe or local oscillator light through refractive materials. This spatial separation is equal to half the velocity of light times the period of the single channel period designated $T_C$.

In operation, it will readily be seen that each modulated pulse produces some sort of a signal in each photomultiplier, even those of the channels for which it does not represent the desired information. The latter unwanted responses occur at a time of no coincidence with a local oscillator pulse in the photocathode and represent a source of background signals. I have devised a filtering technique for eliminating any effect of this background signal upon the ultimate output.

Figure 3:
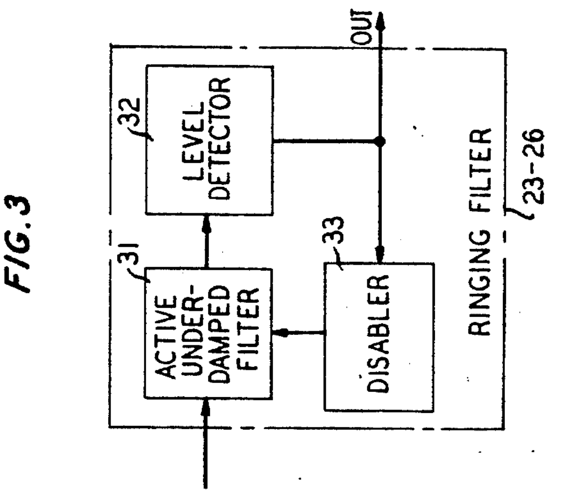
FIG. 3 shows a block diagrammatic arrangement of a bandpass filter of the type useful in the embodiment of FIG. 1.

The filter arrangement, which is incorporated into filters 23 to 26, is shown in block diagrammatic form in FIG. 3. It preferably includes an active underdamped filter 31, receiving an output of a photomultiplier and having its output coupled to a level detector 32. The active underdamp filter 31 is illustratively of the conventional type using $\pi$ and T networks of inductors and capacitors, together with active or amplifying elements which may be adjusted to control the magnitude of certain ones of the capacitances to achieve a desired passband which will be described hereinafter with reference to FIG. 2. A minimum of resistance is used in filter 31 in order that the filter is underdamped and would, if permitted to do so, overshoot or even continue to ring for an indefinite period when subjected to an input frequency that lies within its passband.

The level detector 32 is simply an electronic circuit selected to have a response threshold at a preselected level of filter output. Such a circuit having a threshold is well known. The output of detector 32 is directed in part to the output decoding apparatus (not shown) but is also directed to a circuit such as an electronic relay for disabling the underdamped filter 31 after the passage of the channel time slot and before the occurrence of the next time slot for that channel. The time slot referred to is the time period within which a pulse may be expected to occur at that location to represent a bit of information in that channel. It should be clear that the inherent delay of the disabler 33 should be chosen to be shorter than the interval between the time slots for that channel. Thus, the disabler 33 would typically employ an electronic type relay or switch, rather than an electromechanical type. It would disable the filter 31 by switching a high loss across its output terminals. Such techniques are well known and need not be described further.

The filtering characteristic of the bandpass filters is based upon a mathematical analysis of the embodiment of FIG. 1, as follows:

Let $$E_M = A_M \exp\left[i\left(\omega_M t - \frac{2\pi x}{\lambda_M} + \varphi_M\right)\right] \sum_{n=-\infty}^{\infty} \exp\left[-\frac{1}{2}\left(\frac{t-nT_M}{\Delta T}\right)^2\right] \quad (1)$$

be the electric field of the multiplexed pulse train and $$E_S = A_S \exp\left[i\left(\omega_S t + \frac{2\pi x}{\lambda_S} + \varphi_S\right)\right] \sum_{n=-\infty}^{\infty} \exp\left[-\frac{1}{2}\left(\frac{t-nT_S}{\Delta T}\right)^2\right] \quad (2)$$

be the electric field of the strobe pulse train where $\Delta T$ is the pulse half-width, $A_M$ and $A_S$ are the amplitudes of the multiplexed pulses and the strobe pulses, respectively, $\omega_M$ and $\omega_S$ are the central optical frequencies of the multiplexed pulses and the strobe pulses, respectively, $\lambda_M$ and $\lambda_S$ are the corresponding wavelengths of the multiplexed pulses and strobe pulses, respectively, $\Phi_M$ and $\Phi_S$ are the phases of the multiplexed pulses and the strobe pulses, respectively, $T_M$ and $T_S$ ($=T_C$) are the pulse periods of the multiplexed pulses and the strobe pulses, respectively, and $x$ is a coordinate axis parallel to the light beam. The current as a function of time at the output of one of the photomultipliers is $$i_{OUT}^{(t)} \alpha A_M^2 \left\{\sum_{n=-\infty}^{\infty} \exp\left[-\frac{1}{2}\left(\frac{t-nT_M}{\Delta T}\right)^2\right]\right\}^2 + A_S^2 \left\{\sum_{n=-\infty}^{\infty} \exp\left[-\frac{1}{2}\left(\frac{t-nT_S}{\Delta T}\right)^2\right]\right\}^2 + 2A_S A_M \int_V \cos\left[(\omega_S-\omega_M)t + \frac{2\pi x}{\bar{\lambda}} + \varphi_S - \varphi_M\right] dv \left\{\sum_{n=-\infty}^{\infty} \exp\left[-\frac{1}{2}\left(\frac{t-nT_S}{\Delta T}\right)^2\right]\right\} \quad (3)$$

where the integration is over the illuminated volume of the photocathode and $1/\bar{\lambda} = 1/\lambda_M + 1/\lambda_S$. The first two terms are due to the multiplexed pulses and the strobe pulse alone, while the third term is due to the simultaneous presence of a multiplexed and a strobe pulse at a photocathode. The third term can be integrated to give $$2A_S A_M \frac{\sin\left(\frac{\pi L}{\bar{\lambda}}\right)}{\frac{\pi L}{\bar{\lambda}}} \cos\left[(\omega_S-\omega_M)t+\varphi_S-\varphi_M\right] \left\{\sum_{n=-\infty}^{\infty} \exp\left[-\frac{1}{2}\left(\frac{t-nT_S}{\Delta T}\right)^2\right]\right\} \qquad (4)$$

where $L$ is the thickness of the photocathode. The amplitude of this term will not be significantly reduced as long as $\pi L/\bar{\lambda} < 1/2$ or $L < \bar{\lambda}/2\pi$. Under these conditions, the interaction coherence length is not exceeded; and the photocathode response is not degraded by phase mismatch of the coinciding pulses. These conditions are readily satisfied, as typical photocathode thicknesses are in the neighborhood of 300 to 500 A. By taking the Fourier transform of Equation (4) the frequency spectrum of the signal at the output of one of the photomultipliers is given by $$\begin{aligned} i_{OUT}(\omega) \propto\ & \frac{A_M^2}{T_M}\sum_{n=-\infty}^{\infty} \exp\left[-\left(\frac{n\pi\Delta T}{T_M}\right)^2\right] + \frac{A_S^2}{T_S}\sum_{n=-\infty}^{\infty} \exp\left[-\left(\frac{n\pi\Delta T}{T_S}\right)^2\right] \\ & + \frac{A_S A_M}{T_S} \frac{\sin\left(\frac{\pi L}{\bar{\lambda}}\right)}{\frac{\pi L}{\bar{\lambda}}} \Bigg\{\exp\left[i(\varphi_S-\varphi_M)\right] \sum_{n=-\infty}^{\infty} \exp\left[-\frac{\Delta T^2\left(\frac{2n\pi}{T_S}-(\omega_S-\omega_M)\right)^2}{4}\right] \\ & \times \delta\left(\omega-\left(\frac{2n\pi}{T_S}-(\omega_S-\omega_M)\right)\right) + \exp\left[-i(\varphi_S-\varphi_M)\right] \\ & \times \sum_{n=-\infty}^{\infty} \exp\left[-\frac{\Delta T^2\left(\frac{2n\pi}{T_S}+(\omega_S-\omega_M)\right)^2}{4}\right] \delta\left(\omega-\frac{2n\pi}{T_S}+(\omega_S-\omega_M)\right)\Bigg\} \end{aligned} \qquad (5)$$

Figure 2:
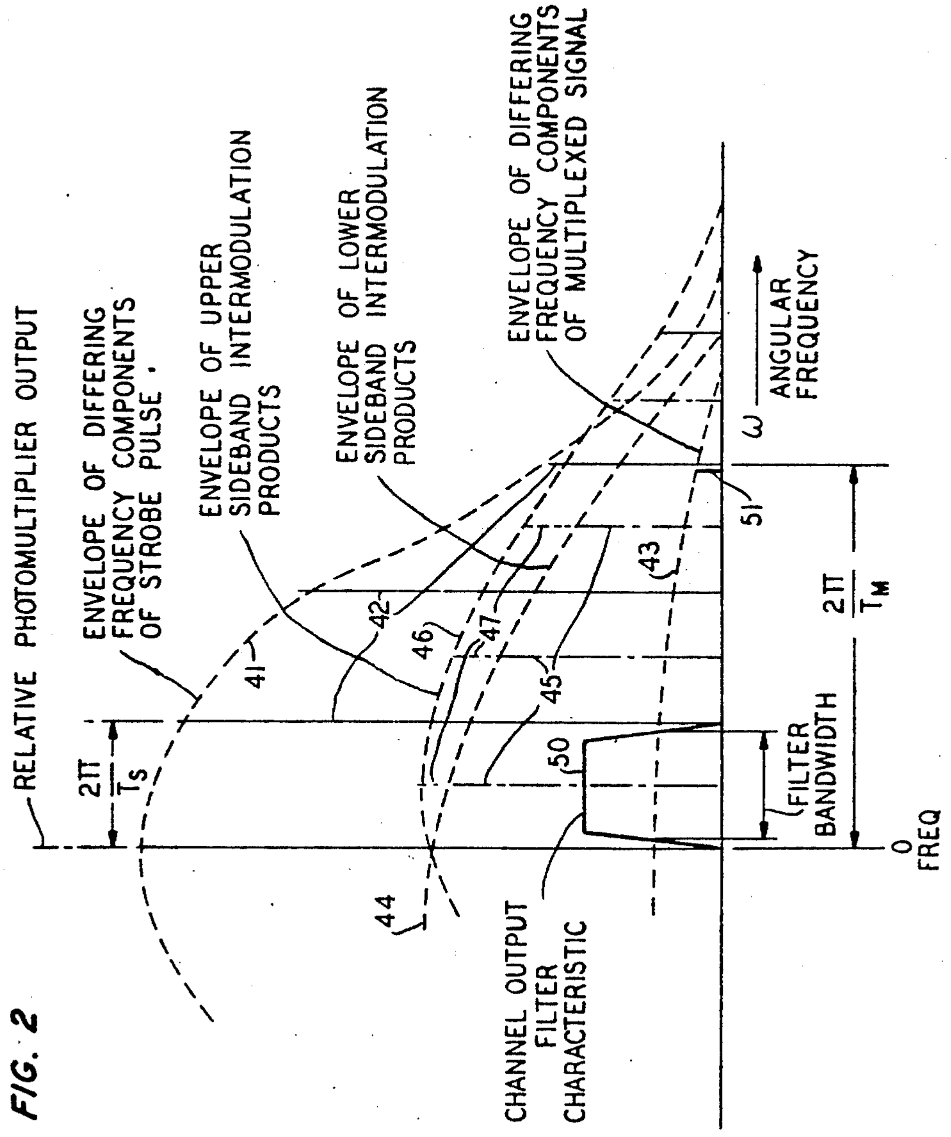
FIG. 2 shows curves which are useful in explaining the theory and operation of my invention.

For the case where $\omega_S-\omega_M = \pi/T_S$ and where $A_S >> A_M$ the resulting frequency spectrum is shown in FIG. 2. For $\Phi_S = \Phi_M$ a rectangular bandpass filter $0 < \omega < 2\pi/T_S$, as shown in the figure will contain a signal only when a multiplexed signal pulse and a strobe pulse are simultaneously present at a photocathode. The filter will contain no signal from the large strobe pulse alone or from a multiplexed pulse alone. Incidentally, the bandwidth of the filter is not quite sufficient to pass information at the single channel rate and thus needs to be followed by a disabling switch.

A more detailed explanation of the curves as shown in FIG. 2 is as follows:

The horizontal axis or abscissa represents angular frequency; and there is shown principally the positive angular frequency portion thereof, even though the Fourier analysis of the modulated pulse trains and strobe pulses provides a related negative frequency portion which has little physical meaning. The ordinate represents the relative photomultiplier output. The dotted curves of approximately Gaussian shape do not represent any measurable values in the system of FIG. 1, except at the points at which the various pulses have frequency components according to the Fourier analysis.

Curve 41 represents the envelope of the differing frequency components of the strobe pulses, and the actual components are shown as the vertical lines 42. The angular frequencies of these components of the strobe pulses are separated in frequency by the amount of $2\pi/T_S$ where $T_S$ is the period of the strobe pulse. Curve 43 represents the envelope of the various frequency components of the multiplexed signal; and one frequency component is shown as 51. This will coincide with one of the frequency components 42 since the modulated pulses occur at multiples of the strobe pulse rate. Of pertinence to the operation of the bandpass filters 23 through 26 are the curves 44 and 46 which are the envelopes of the different frequency components 45 and 47, respectively, due to intermodulation or coincidence of signal and strobe pulses. The frequency components 45 are represented by lines having dashes, separated by a dot, and are offset from the components of the multiplexed pulses and strobe pulses by about $\pi/T_S$, even though the separation between the frequency components 45 is twice as great, $2\pi/T_S$. The curve 44 and its frequency components 45 are, respectively, the envelope and the upper sideband intermodulation product produced in the photocathodes. The curve 46 and its similar frequency components having differing relative amplitudes with respect to the frequency components 45 represent the lower sideband intermodulation products and their envelope. The frequency components 45 and 47 need not coincide as shown in FIG. 2. Components 45 and 47 will separate somewhat if the local oscillator frequency drifts. It is only necessary for at least one of them to lie within the filter bandwidth.

The bandpass filters 23 through 26 have a filter bandwidth somewhat less than $2\pi/T_S$. The filter passband extends from a point just above zero frequency to a point just below the frequency $2\pi/T_S$.

Thus, the lowest intermodulation product frequencies fall right in the middle of the passband whereas the other frequency components of the multiplexed pulses and the strobe pulses alone lie outside the passband. Thus, the bandpass filter will have an output if a pulse is present in the desired channel and will not have an output if no pulse is present in the desired channel. The disabling switch following the filter will prevent carryover from one time slot to the next of the desired channel. In addition, its output will have a negligibly low response to the multiplexed pulses or the strobe pulses in the absence of their coincidence.

It should be noted that, while the foregoing embodiment appears to be limited to the space-sorting of about ten channels, it can be used in systems having many more channels. One arrangement would employ a time-sorting demultiplexer of the type disclosed by S. J. Buchsbaum et al. in U.S. Pat. No. 3,506,834, issued Apr. 14, 1970, preceding a plurality of the space-sorting demultiplexers disclosed herein. Each of the latter would receive its information pulses at a respective position at the periphery of the output reflector of the conical scan deflector of the time-sorting demultiplexers. Several channels in the train should be left empty to provide adequate guard spaces for the transition times of the time-sorting demultiplexer.

Another space-sorting demultiplexer for time-division-multiplexed receivers is the following. The multiplexed beam is passed through an array of $n$ (the number of channels) optically nonlinear crystals, such as barium sodium niobate, separated by the spatial separation of the channels. Note that this separation is twice as great as in FIG. 1. A strobe pulse at another frequency (for example, 1.04 $\mu$ obtained by optical parametric oscillation pumped by a mode-locked Nd:YA1G laser) is introduced simultaneously to all $n$ mixing crystals. The strobe pulse has a repetition frequency equal to the single channel clock frequency. It is timed by suitable pathlengths so that it is in mixing crystal No. 1 when the signal pulse from channel No. 1 is in mixing crystal No. 1, in mixing crystal No. 2 when the signal pulse from channel No. 2 is in crystal No. 2, et cetera. If channel No. 1 contains an optical pulse then photomixing will occur in the No. 1 crystal due to nonlinear effects in the crystal. The mixing will produce a signal at the sum frequency, 5,250 A, which is coupled out of the crystal by a dichroic beam splitter and detected by a photodetector. The dichroic beam splitter has to be reflective for the strobe and the sum frequency and transmissive for the signal frequency. The second harmonic of the signal at 5,320 A. and the strobe at 5,200 A. would be blocked from the detector by a proper optical bandpass filter. This would be repeated at each crystal and the separation into individual channels would be effected.

Different synchronized lasers could produce the strobe pulse, instead of the single laser source.

In all cases, it is to be understood that the above-described arrangements are merely illustrative of a small number of the many possible applications of the principles of the invention. Numerous and varied other arrangements in accordance with these principles may readily be devised by those skilled in the art without departing from the spirit and scope of the invention.

I claim:

1. A receiver for pulse-code-modulated optical pulses that are time-division-multiplexed in pulse trains recurring at the channel bit rate to represent information in a plurality of channels, comprising means for generating optical local oscillator pulses recurring at the channel bit rate and having an optical frequency differing from that of the modulated pulses, and means for demultiplexing and detecting said modulated pulses, comprising means for directing said local oscillator pulses in the opposite direction to that of said modulated pulses along a common path, a plurality of photomultiplier mixing means aligned along said common path for mixing respective ones of said modulated pulses with one of said local oscillator pulses, and a plurality of means for sensing at the outputs of respective ones of said photomultiplier mixing means signals representing coincidences of said modulated pulses and said local oscillator pulse.

2. A receiver for pulse-code-modulated optical pulses that are time-division-multiplexed in pulse trains recurring at the channel bit rate to represent information in a plurality of channels, comprising means for generating optical local oscillator pulses recurring at the channel bit rate and having an optical frequency differing from that of the modulated pulses, and means for demultiplexing and detecting said modulated pulses, comprising means for directing said local oscillator pulses in the opposite direction to that of said modulated pulses along a common path, a plurality of photosensitive means aligned in the path of said pulses for generating respective different channel signals having frequency components between zero frequency and the frequency corresponding to the channel bit rate, and a plurality of filter means for passing said frequency components and blocking frequencies equal to or greater than the channel bit rate and equal to zero frequency.

3. A receiver for pulse-code-modulated optical pulses that are time-division-multiplexed in pulse trains recurring at the channel bit rate to represent information in a plurality of channels, comprising means for generating optical local oscillator pulses recurring at the channel bit rate and having an optical frequency differing from that of the modulated pulses, and means for demultiplexing and detecting said modulated pulses, comprising a plurality of photomultipliers having semi-transparent photocathodes sequentially intercepting all of said modulated pulses, means for directing said local oscillator pulses through said photocathodes in a direction and sequence opposite to the direction and sequence of the modulated pulses, and means for sensing at the output of said photomultipliers signals representing coincidences of modulated pulses and local oscillator pulses.

4. A receiver according to claim 3 in which the means for sensing signals representing coincidences comprises a plurality of passband filters respectively coupled to the outputs of said photomultipliers for passing a band of frequencies between zero frequency and the channel bit rate.

5. A receiver according to claim 4 in which the plurality of passband filters has a corresponding plurality of means for disabling said respective filters before the occurrence of the next channel time slot.

* * * * *